Sept. 10, 1946.   H. F. PITCAIRN   2,407,327
AIRCRAFT WITH POWER DRIVEN ROTOR
Filed March 24, 1942
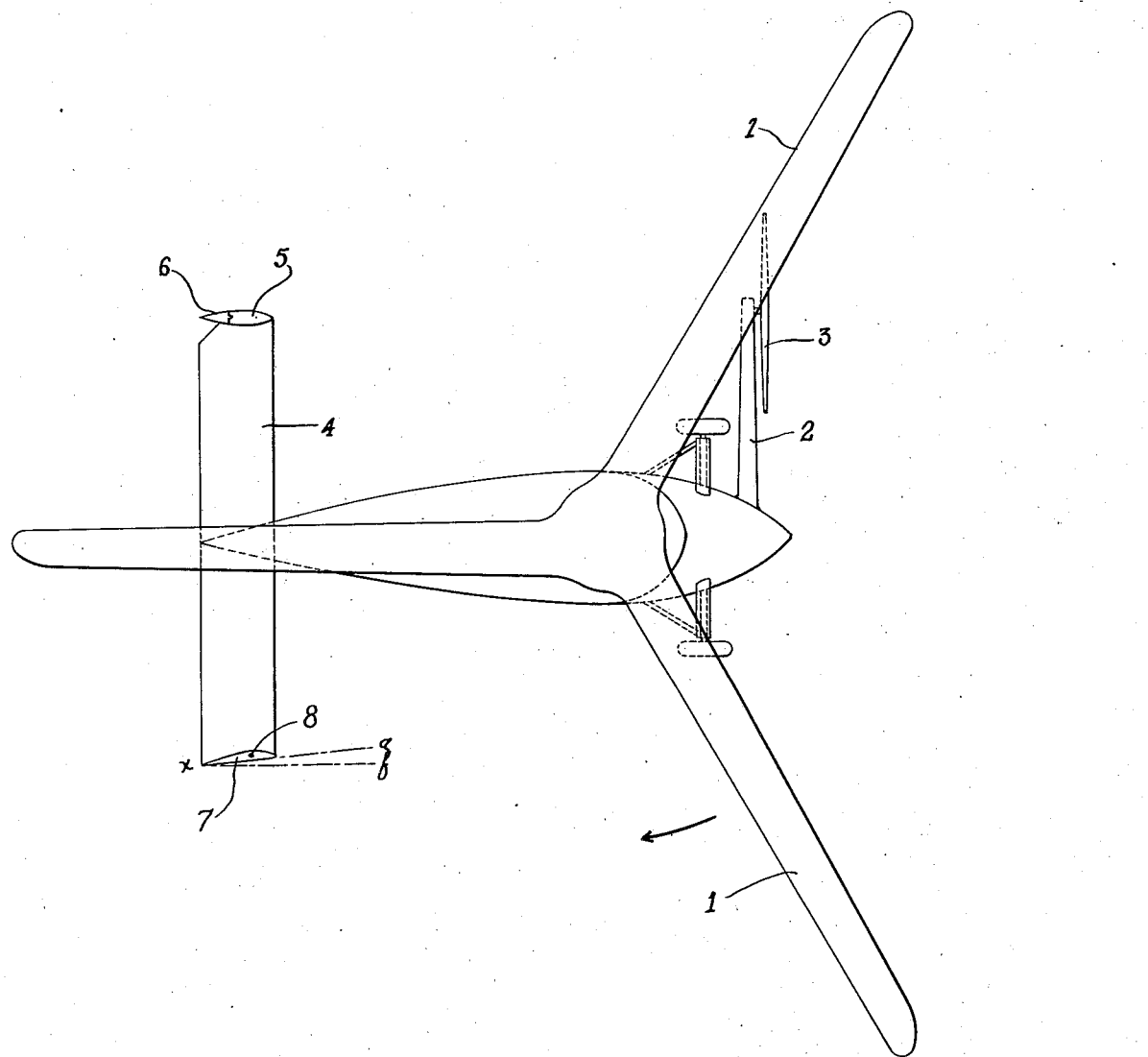
INVENTOR
Harold F. Pitcairn
BY
ATTORNEYS Patented Sept. 10, 1946

2,407,327

UNITED STATES PATENT OFFICE 2,407,327

AIRCRAFT WITH POWER DRIVEN ROTOR

Harold F. Pitcairn, Bryn Athyn, Pa., assignor to Autogiro Company of America, Philadelphia, Pa., a corporation of Delaware Application March 24, 1942, Serial No. 435,925

6 Claims. (Cl. 244—17)

This invention relates to aircraft, and is particularly concerned with a helicopter type craft having a power driven rotor for sustension.

In an aircraft of this type driving the rotor sets up a torque reaction in the body of the machine, tending to rotate the body in a direction opposite to the direction of rotation of the rotor. The invention is particularly concerned with torque counteraction and constitutes an improvement in that general type of helicopter which is disclosed in copending Bennett application Serial No. 353,810, filed August 23, 1940, issued as Patent 2,317,340, April 27, 1943.

In accordance with the disclosure of said Bennett application, the aircraft is equipped with one or more airscrews for effecting translational flight, the airscrew or airscrews being offset from the rotor axis and so arranged that the mean airscrew thrust lies at that side of the rotor axis on which the rotor blades advance during translational flight. In this way the airscrew serves not only to contribute thrust for effecting translational flight, but also to neutralize the torque reaction set up in the body of the machine as a result of power drive of the rotor.

Ordinarily, the thrust of an airscrew is at its maximum when the aircraft is not in translational flight, the thrust diminishing with increase in translational flight speed. In an aircraft of the kind just mentioned, this variation in thrust as between different flight conditions results in inaccuracy of torque neutralization, at least under some flight conditions.

The present invention is particularly concerned with the provision of means automatically compensating for differences in airscrew thrust (and, therefore, of torque counteractive effect) as between different flight conditions.

According to the preferred practice of this invention, the offset and magnitude of the airscrew thrust are such as to approximately neutralize the rotor torque reaction during hovering or low speed translational flight, and the aircraft is further equipped with an airfoil (for instance, a tail surface) arranged to develop a force in a direction to supplement the torque counteraction of the airscrew during increased and high speed translational flight.

According to the invention, the torque counteractive airfoil is positioned outside of the slipstream of the airscrew, so that little if any effect is derived therefrom during hovering and low speed flight, the rotor torque being at this time neutralized by the thrust of the airscrew. As the machine picks up forward speed the torque counteractive effect of the airfoil correspondingly increases, thereby compensating for the loss of torque counteractive effect derived from the airscrew.

In connection with the foregoing, it will be understood that the torque counteraction provided by the airscrew and by said airfoil are only approximate, it being impracticable to secure exact torque compensation from these means under all of the variables encountered over a wide range of flight conditions. With this in mind, the invention further contemplates employment of adjustment means for said airfoil, whereby to permit variation in its torque counteractive effect.

Still further, the craft is desirably equipped with a rudder located within the slipstream of the airscrew, so as to be effective under all conditions of flight, and coupled with the usual rudder control, such as rudder pedals. A rudder control of normal type may thus be used to maintain the desired position in yaw under all conditions.

How the foregoing and other objects and advantages are attained will appear more fully from the following description, referring to the accompanying drawing, in which the single figure is an outline plan view of an aircraft constructed in accordance with this invention.

Before considering the drawing in detail, it should be noted that the invention is applicable to any helicopter type aircraft in which an unbalanced or unneutralized torque reaction is set up in the body. The most common type of such aircraft is the single rotor type, although it is to be noted that even in certain multiple rotor helicopters some unbalanced torque reaction may exist.

In addition to the above, it is to be understood that the invention is applicable to any aircraft of the general class referred to, having either one or more than one propulsive airscrew. Even in a machine having two offset airscrews, the mean airscrew thrust may at times be offset from the rotor axis. By way of example, it is mentioned that, as shown in the copending Bennett application above referred to, such an aircraft may be equipped with two airscrews, one offset toward one side and the other toward the other side of the machine, only one airscrew being used under those conditions of flight in which the rotor is being power driven.

In considering the drawing, it is also mentioned that numerous details not having a direct bearing on the invention have been omitted.

A machine having only a single rotor and only a single airscrew is illustrated in the drawing. Each blade 1 of the rotor is desirably coupled with the rotor hub by means of pivots (not shown), including at least a flapping pivot, and preferably also a drag pivot, the rotor hub being mounted above the body of the aircraft, and desirably positioned so that the center of gravity of the craft lies on or close to the rotor axis, although this relationship may be varied somewhat during maneuvering, as by tilting the rotor hub. The rotor is adapted to be driven from an engine in the body, the drive from the engine to the rotor hub including a manual clutch, as well as a freewheeling or overrunning clutch, so as to permit autorotation of the rotor and descent without power.

It is further contemplated that the rotor shall incorporate control means for effecting maneuvering, which control means may take the form of a tiltable mount for the rotor hub substantially in accordance with copending application of Juan de la Cierva, Serial No. 645,985, filed December 6, 1932, which issued July 31, 1945, as Patent No. 2,380,580. Mechanism for changing the blade pitch may also be incorporated, as in the copending Bennett application above referred to. Such mechanism may be used to control the lift of the rotor and may also be employed upon engine failure, to reduce the blade pitch to a value suitable for autorotation.

The invention is applicable to various helicopter type aircraft, in which various proportions (or none) of the thrust for translational flight are secured by tilting the rotor forwardly. In any event, the craft of this invention is equipped with an airscrew which, as brought out herebelow, is positioned so as to serve simultaneously for counteraction of rotor driving torque and to contribute thrust for translational flight. An outrigger 2, for support of the airscrew 3, projects from that side of the body on which the rotor blades advance during translational flight. The airscrew is adapted to be driven by the engine in the body and because of the offset from the rotor axis, as described just above, the airscrew provides a torque counteractive force approximately neutralizing the rotor driving torque.

The craft is equipped with an empennage desirably including horizontal surfacing 4 serving to carry other generally vertical surfaces including the fixed fin 5 and controllable rudder 6, which are arranged in the slipstream of the airscrew 3. Toward the opposite end of the tail, a surface 7 is mounted, this surface preferably being of cambered shape and so positioned as to set up a force which produces a moment acting in a direction opposing the torque reaction set up when the rotor is driven. Airfoil 7, moreover, is set at a positive angle with respect to the direction of translational flight. This angle is indicated by the lines $x$—$a$ and $x$—$f$. Since this airfoil is disposed outside of the influence of the slipstream of the propulsive airscrew 3, the torque counteractive effect of the airfoil is dependent upon airflow set up in translational flight, and increases with increase in translational flight speed.

According to the invention, the airscrew is arranged so that the extent of offset and the magnitude of the thrust approximately neutralize the torque reaction incident to driving the rotor, when the machine is hovering or in low speed translational flight. Since the thrust of the airscrew diminishes with increase in translational flight speed, the torque counteractive effect of the airscrew is correspondingly reduced, but this reduction is compensated for by the increase in effectiveness of the airfoil 7, as translational flight speed is increased.

In accordance with the preferred arrangement, the "volume" of the airfoil 7 is such as to approximately compensate for the loss in torque counteractive effect of the airscrew at normal cruising speed. The "volume" or overall effect of such an airfoil at any given speed may be calculated from a number of known factors including the area of the surface, the type of airfoil, the angle of airfoil, and the offset thereof from the rotor axis.

The torque counteractive airfoil 7 is provided with means of adjustment, including a pivot post mounting indicated at 8, whereby the angle of the surface may be altered. The adjustment means desirably provides for fixedly positioning the surface at any suitable angle. Although it is contemplated that the control for the adjustment be located within reach of the pilot in flight, this may not be necessary in some machines. By the provision of such control mechanism for fixedly adjusting the airfoil 7, compensation may be made to meet variations in flight conditions. For instance, the torque counteractive effect desired from the airfoil 7 may be different with different speeds of the engine driving the airscrew and rotor.

In addition to the above, while the rudder 6 may be used to correct for minor inaccuracies in torque compensation, the provision of means for adjusting the angle of the airfoil 7 will enable maintenance of the rudder control in the mid position during straight-line translational flight, thereby leaving the full range of deflection of the rudder for use in maneuvering.

I claim:

1. In an aircraft having a single sustaining rotor adapted to be power driven, and, when driven, setting up a torque reaction in the body of the craft, airscrew means positioned to develop thrust, acting in a direction to induce translational flight, with the mean thrust line thereof offset from the rotor axis toward that side on which the airscrew thrust opposes said torque reaction, an airfoil positioned at least in large part outside of the slipstream of the airscrew means, and arranged to oppose said torque reaction during translational flight, and a controllable rudder disposed at least in large part within the slipstream of the airscrew means.

2. A construction in accordance with claim 1 in which the torque counteractive effect of the airscrew thrust approximately neutralizes said torque reaction while hovering or in low speed translational flight, and in which the torque counteractive effect of the airscrew thrust together with the torque counteractive effect of said airfoil approximately neutralizes said torque reaction in high speed translational flight.

3. In an aircraft having a single sustaining rotor adapted to be power driven, the said rotor, when driven, setting up a torque reaction in the body of the craft, mechanism for counteracting said torque reaction including airscrew means positioned with the mean thrust line thereof offset from the rotor axis in a direction such that the airscrew thrust opposes said torque reaction, a normally fixed airfoil positioned to develop a thrust opposing said torque reaction during translational flight of the craft, and a controllable rudder in the slipstream of said airscrew means.

4. An aircraft including rotative sustaining wing means adapted to be power driven and, when driven, setting up a torque reaction in the body of the craft, airscrew means positioned to induce translational flight, with the mean thrust line thereof offset from the axis of rotation of said wing means toward that side on which the airscrew thrust opposes said torque reaction, and a controllable airfoil disposed at least in large part outside of the slipstream of the airscrew means and positioned to oppose said torque reaction during translational flight, and a controllable rudder positioned at least in large part within the slipstream of the airscrew means.

5. An aircraft including rotative sustaining wing means adapted to be power driven and, when driven, setting up a torque reaction in the body of the craft, airscrew means positioned with the mean thrust line thereof offset from the axis of rotation of said wing means toward that side on which the airscrew thrust opposes said torque reaction, the offset and magnitude of the airscrew thrust being such as to approximately neutralize the torque reaction when hovering and in low speed translational flight, a torque counteractive airfoil positioned at least in large part outside of the slipstream of said airscrew means and inclined with respect to the normal path of translational flight of the aircraft to set up a directional moment in a sense opposing the torque reaction of the rotative sustaining wing means, and additional means for directional control of the aircraft during translational flight comprising a controllable rudder disposed at least in large part within the slipstream of the airscrew means.

6. An aircraft including rotative sustaining wing means adapted to be power driven and, when driven, setting up a torque reaction in the body of the craft, airscrew means positioned to induce translational flight, with the mean thrust line thereof offset from the axis of rotation of said wing means toward that side on which the airscrew thrust opposes said torque reaction, the offset and magnitude of the airscrew thrust being such as to approximately neutralize the torque reaction when hovering and in low speed translational flight, a torque counteractive airfoil positioned at least in large part outside of the slipstream of said airscrew means and inclined with respect to the normal path of translational flight of the aircraft to set up a directional moment in a sense opposing the torque reaction of the rotative sustaining wing means, and additional means for directional control of the aircraft during translational flight, comprising a controllable rudder disposed at least in large part within the slipstream of the airscrew means, the combined torque counteractive effect of the airscrew means and the torque counteractive airfoil approximately neutralizing the torque reaction of the rotative sustaining wing means at high speed translational flight.

HAROLD F. PITCAIRN.